United States Patent [19]

Haapala

[11] 4,213,241

[45] Jul. 22, 1980

[54] CAKE LAYER CUTTER

[76] Inventor: Ray E. Haapala, Rte. 3, Box 76, Dassel, Minn. 55325

[21] Appl. No.: 25,344

[22] Filed: Mar. 30, 1979

[51] Int. Cl.³ ............................................. A21C 5/00
[52] U.S. Cl. ................................. 30/115; 30/296 R
[58] Field of Search ................. 30/115, 114, 116, 117, 30/296 R, 296 A

[56] References Cited

U.S. PATENT DOCUMENTS

| | | | |
|---|---|---|---|
| 173,777 | 2/1876 | Dugan et al. | 30/116 |
| 922,039 | 5/1909 | Purcell | 30/116 |
| 2,779,099 | 1/1957 | Barone | 30/296 R |
| 2,964,844 | 12/1960 | Steward et al. | 30/116 |
| 3,277,754 | 10/1966 | Lopez | 30/116 |
| 3,583,068 | 6/1971 | Green | 30/116 |
| 4,028,806 | 6/1977 | Sheldon | 30/296 R |

Primary Examiner—Nicholas P. Godici
Assistant Examiner—J. T. Zatarga
Attorney, Agent, or Firm—James H. Littlepage

[57] ABSTRACT

A cutting blade extends between the legs of a U-frame. The legs have incrementally adjustable length-wise extensions so that the distance between the blade and the ends of the leg extensions can be adjustable. By this means the height of the blade above a table upon which a cake is supported can be predetermined so as to cut cake layers at predetermined standard thicknesses.

1 Claim, 3 Drawing Figures

U.S. Patent
Jul. 22, 1980
4,213,241
Fig. 1
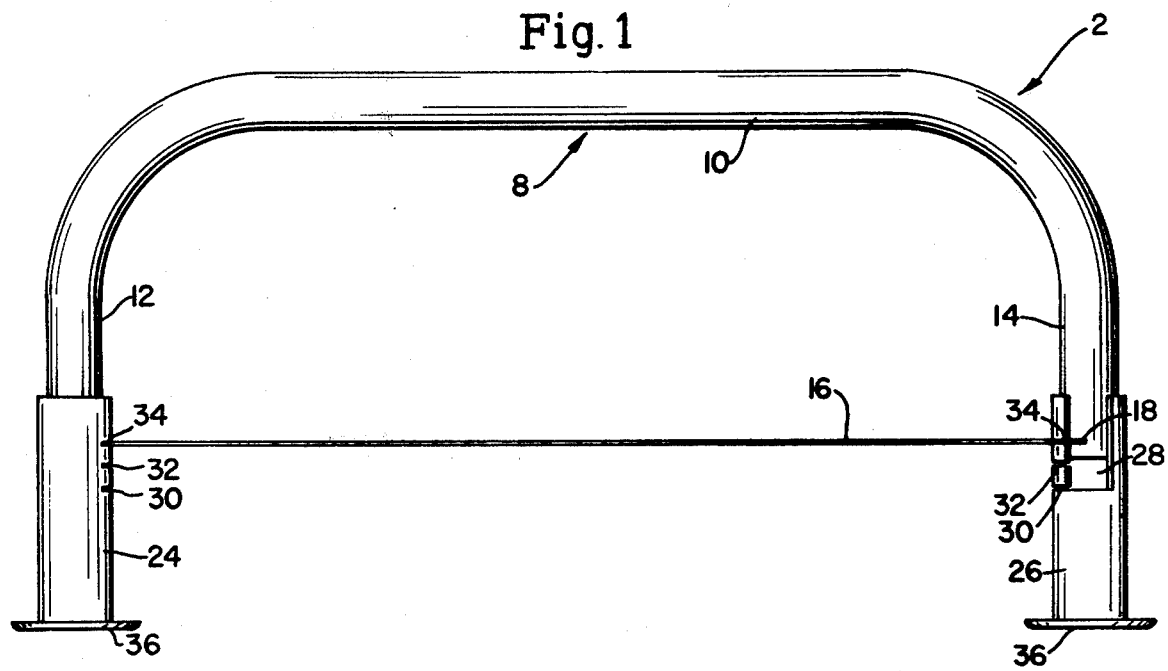
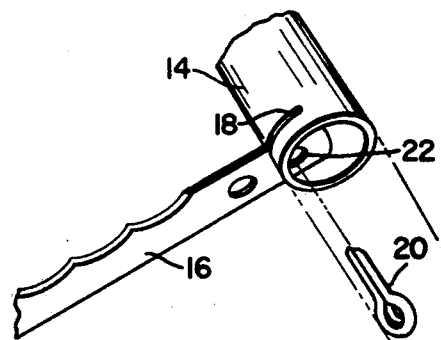
Fig. 2
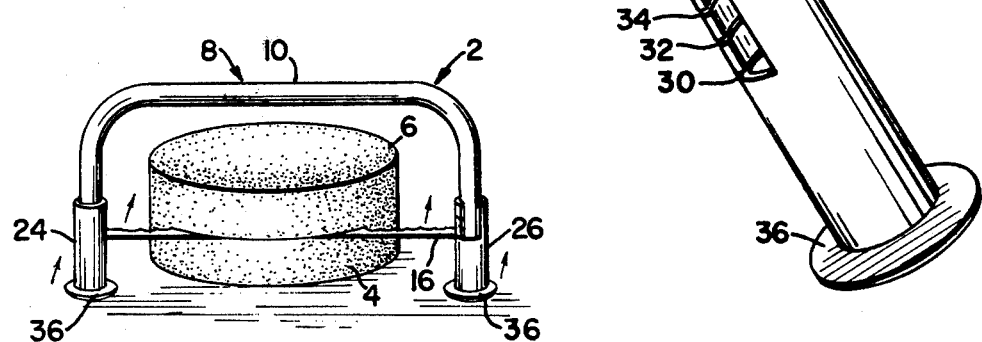
Fig. 3

CAKE LAYER CUTTER

OBJECTS

In the making of fancy cakes, it is oftentimes desirable to stack a plurality of layers with icing between them. In such cakes, like wedding cakes, it is essential that the layers be perfectly flat, lest a "leaning Tower of Pisa" effect results. and it is furthermore essential that the layers be of predetermined thickness. Various cake-layer cutters have been devised, some of which use a fine wire, such as in a cheese cutter. These are not successful, it being necessary that a very sharp and preferably serrated blade be used, lest the cake tear and break. The object now is to provide a cakelayer cutter comprised of a U-frame, somewhat like the frame of a hacksaw, with an extremely sharp serrated blade mounted between the legs of the U, the cutting axis of the blade being disposed sidewise so that it can be swept across a cake layer. This invention is particularly concerned with the means for predetermining the height of the blade above the table surface along which the cutter is swept, so that the height of the cake-layer which is cut by the blade can be predetermined, and so that various heights at predetermined increments can be obtained. Thus exactly uniformly thick cake-layers and also layers of various standard thicknesses can be obtained. To this end, it is now intended to provide a U-frame with adjustable leg extensions on the free ends, the leg extensions being adjustable in increments so as to extend the lengths of the legs beyond the blade and hence the height of the blade above the table.

These and other objects will be apparent from the following specification and drawing in which:

FIG. 1 is a side elevation of the cake-layer cutter;

FIG. 2 is an enlarged exploded view of the elements appearing in the lower right hand portion of FIG. 1; and FIG. 3 is a perspective view illustrating the operation of the cake-layer cutter.

Referring now to the drawings in which like reference numerals denote similar elements, the cake-layer cutter 2 is used for cutting cake layers 4 of predetermined thickness from a cake 6. It will be understood, that instead of being used to sever off a layer 4 from a compartively thick piece of cake, the device is equally useful for shaving off the upper portion of a thinner cake-layer.

Cake cutter 2 is comprised of a U-shaped handle 8, comparable to a hacksaw frame, and consisting of an elongate bight portion 10 and parallel legs 12 and 14. The blade 16, serrated and very sharp, extends between the legs, its end being engaged through slots 18 in the legs, and retained therein by suitable means, such as slightlysprung cotter pins 20 engaged in holes 22 through the blade ends.

Legs 12 and 14 are provided with adjustable extensions 24, 26, each having a keyway 28 through which the blade can move, and each having a series of slots 30, 32 and 34 disposed at intervals along and extending from an edge of the keyway slot 28 which provide clearance for the blade when the leg extensions are telescopically adjusted along the lengths of the frame legs. The leg extensions 24 and 26 telescope over the adjacent free ends of the legs 12 and 14, and are then turned so as to trap the blade into a selected one of the slots 30, 32 or 34. This, of course, predetermines the heigh of the blade 16 above the free ends of the leg extensions, the latter of which are provided with flat-bottom shoes 36 to slide along a table-top 38. In the present example, if the blade is engaged in slots 30, the cake-layer cut thereby will be 1½ inches thick. If slots 32 are used the layer will be 1¾ inches thick, and for slots 34, 2 inches thick. By selecting the same slot 30, 32 or 34 for each leg extension, the height of the blade 16 above the table-top is predetermined, and since the incremental spacing of the slots 30, 32 and 34 from one another are the same for both leg extensions, the top of the layer 4 will always be level and parallel with the table-top. If desired, a multi-layer cake with layers ascending with decreasing thicknesses can be obtained by using the slots 34 for a lowermost layer, slots 32 for an intermediate layer, and slots 30 for an upper layer. The flat-bottom shoes 36, when placed against a table-top 38, function as guides which tend to maintain the frame legs 12 and 14 perpendicular to the table-top 38 and the cutting axis of the blade 16 parallel with the table-top 38.

I claim:

1. A cake-layer cutter comprising:
a U-frame having a bight portion and a pair of spaced parallel hollow tubular legs extending therefrom,
an elongate flat blade having opposite end portions respectively disposed in slots in the legs which extend in the circumferential directions of the legs, and
leg extension means extending from free ends of said legs and having free end portions adapted to slide along a table top upon which a cake-layer is supported,
said leg extension means comprising tubular members telescopically engaged on the frame legs and being slidable lengthwise along the frame legs,
each said leg extension means having a lengthwise slot therein for providing clearance over a blade end portion when the leg extension means is slid along the length of a frame leg and a plurality of other slot means extending in the circumferential direction of the leg extension means from the edge of the lengthwise slot therein and being spaced from one another in the lengthwise direction of the leg extension means, said other slots being selectively engagable over a blade end portion whereby to provide incremental adjustability of the distance between the blade and the free end portion thereof.

* * * * *